United States Patent

Grundy

[15] 3,691,462
[45] Sept. 12, 1972

[54] RATE PARAMETER INDICATOR HAVING METER MOVEMENT SMOOTHING AT LOW RATES

[72] Inventor: Reed H. Grundy, Murrysville, Pa.
[73] Assignee: Westinghouse Air Brake Company, Swissvale, Pa.
[22] Filed: Oct. 21, 1971
[21] Appl. No.: 191,412

Related U.S. Application Data

[62] Division of Ser. No. 879,716, Nov. 25, 1969, Pat. No. 3,638,115.

[52] U.S. Cl. ................................................. 324/166
[51] Int. Cl. ........................... G01p 3/48, G01p 3/54
[58] Field of Search ............................ 324/166, 125

[56] References Cited

UNITED STATES PATENTS

| | | |
|---|---|---|
| 2,681,952 | 6/1954 | Gilbert.................324/125 X |
| 2,737,627 | 3/1956 | Lynch et al.............324/125 |
| 3,569,737 | 3/1971 | Bauer.................324/166 UX |

*Primary Examiner*—Alfred E. Smith
*Attorney*—H. A. Williamson et al.

[57] ABSTRACT

This disclosure relates to a rate parameter indicator which uniquely allows extremely accurate measuring and indicating of a rate parameter at low rates due to provision of a smooth linear signal to an indication meter circuit. The system incorporates a low voltage drift switching circuit which is coupled to a constant-width pulses, the frequency of which is proportional to a rate parameter. A meter jitter minimizing circuit is electrically coupled to the low voltage drift switching circuitry, as well as the constant voltage source, and includes an averaging circuit which allows the meter jitter minimizing means to provide the aforementioned smooth linear signal to the indication meter circuit in a unique manner.

15 Claims, 4 Drawing Figures

Without
Capacitor
C.

With
Capacitor
C.

With Indication
Means Connected
to $V_z$

RATE PARAMETER INDICATOR HAVING METER MOVEMENT SMOOTHING AT LOW RATES

This application is a division of my copending application for Letters Patent of the United States, Ser. No. 879,716, filed Nov. 25, 2969, now Pat. No. 3,638,115, for Rate Parameter Indicator Having Meter Movement Smoothing At Low Rates.

My invention relates to a rate parameter indicator.

More specifically, my invention relates to a rate parameter indicator which incorporates a meter jitter minimizing circuit electrically coupled to an indication meter device to smooth meter movement in the meter device during the measuring and indicating of a rate parameter by the indication meter device at low rates. The rate parameter to be measured and indicated is represented by a proportional pulse train of constant-width pulses. The meter jitter minimizing circuit is also electrically coupled to a constant voltage reference source and is responsive to each of the above-noted constant-width pulses. Accordingly, the meter jitter minimizing circuit generates over a predetermined time period, an averaging of a recurring quantity which occurs with the presence of each of the above-noted constant-width pulses, the recurring quantity being the sum of the constant reference voltage plus the product of a predetermined impedance ratio times the constant reference voltage, the average of the recurring quantity over a predetermined time period being the sum of the constant reference voltage plus the product of the predetermined impedance ratio times the constant reference voltage all times a pulse frequency factor, or duty cycle. The pulse frequency factor is defined as the ratio of the time that a constant-width pulse is present to the time from the leading edge of that pulse to the leading edge of the next successive constant-width pulse. An averaging circuit is included in the meter jitter minimizing circuit to provide the above-noted averaging of the aforementioned sums over a predetermined time period. As a result, a substantially linear indication output is provided to the indication meter device via the aforementioned electrical coupling between the meter jitter minimizing means and the indication meter device. This output is proportional to the rate parameter to be measured and indicated, and assures the desired meter movement smoothing in the indication meter device. This phenomenon occurs due to the fact that the produced smooth linear indication rather than a pulsed indication is available for measurement at low rates.

In prior art arrangements for measuring and indicating speeds of moving objects, there were several types of systems employed with respect to measuring rates of incoming pulse trains which were rate parameters proportional to object speed. One type of system included a meter-capacitor circuit whereby a capacitor was incorporated for time averaging of input pulses to a meter. A second type of prior art measuring system included a D'arsonval meter which is a time averaging device.

Upon review of the meter-capacitor type of time-averaging arrangement, it will be appreciated that an ammeter had been placed in parallel connection with a capacitor, the parallel arrangement receiving a constant-width, constant-height pulse input proportional to the rate of the speed of an object. The capacitor charged and discharged according to the presence or absence of an incoming pulse and accordingly, the voltage characteristic of the capacitor in that environment provided an averaging effect to be employed for provision of indications of object speed. This arrangement had certain undesirable features. For example, while being a fairly accurate means for indication of extremely high object speeds, at very low speeds the capacitor voltage characteristic curve became unsmooth and this caused the needle of the meter to waver about the true speed of the object. Correction of this disadvantage could only be achieved by increasing the R-C time constant of the meter-capacitor circuit, since with an increased time constant measuring of low object speeds would become smooth after a permissible lag time. Since it was impossible to increase the internal resistance of the meter compensation compensation could only be achieved by increasing the capacitance of the capacitor. Since the normal resistance of the meter was on the order of 100 ohms, this meant that for a permissible time constant of 0.25 second the capacitance would have to be 250,000 microfarads. It is obvious that such a large capacitance is highly undesirable because of costliness, mechanical disadvantage due to size, as well as electrical infeasibility.

In the above-noted second type of prior art speed measuring arrangement, the D'arsonval meter, being a very sensitive device, would tend to follow the waveform of low speed incoming pulse trains. Readings from the D'arsonval meter were thus unreliable since the meter was no longer time averaging the incoming signal, but was passive in nature.

The above-noted types of disadvantages in prior art speed measuring and indication circuits being present, it is therefore desirable to employ a speed indication system which substantially eliminates such disadvantages.

It is therefore an object of this invention to provide an improved rate parameter indicator with meter movement smoothing at low rates which incorporates a meter jitter minimizing circuit which insures rate indication accuracy and readability over low rate frequency ranges.

Another object of this invention is to provide a novel rate parameter indicator which provides a smooth linear indication of the speed of a moving object by use of an operational amplifier in conjunction with a feedback averaging circuit to thereby accomplish meter movement smoothing.

In the attainment of the foregoing objects, the present invention incorporates a rate parameter indicator having meter movement smoothing at low rates and including in combination low voltage switching means, constant voltage means, meter jitter minimizing means, and indication means. The low drift voltage switching means is electrically coupled to a preselected reference node, and has a constant pulse-width input with a duty cycle proportional to a rate parameter. The duty cycle is defined as the ratio of the time that one constant-width pulse is present to the time from the leading edge of that pulse to the leading edge of the next successive pulse. The low voltage switching means is also electrically coupled to the constant voltage means so that whenever a pulse appears on the constant pulse-width input to the low voltage switching means, a constant voltage remains across the low voltage drift switching means.

The meter jitter minimizing means is electrically coupled to the low voltage drift switching means and to the constant voltage means. Accordingly, over the above-noted predetermined time period, the meter jitter minimizing means generates a time average of a recurring quantity which occurs with each constant-width pulse at the input of the low voltage switching means. This recurring quantity is the sum of the constant voltage across the low voltage switching means plus the product of a predetermined impedance ratio times the constant voltage across the low voltage switching means. The time average of the recurring quantity over the predetermined time period is the sum of the constant voltage across the low voltage switching means plus the product of the predetermined impedance ratio times the constant voltage across the low voltage switching means all times the duty cycle of the constant pulse-width input to the low voltage drift switching means. The meter jitter minimizing means includes averaging means which provides the above-noted averaging of the aforementioned recurring sum over the predetermined time period to produce a smooth linear indication proportional to the rate parameter on an output of the meter jitter minimizing means. This output of the meter jitter minimizing means is electrically coupled to the aforementioned indication means. The indication means is also electrically coupled to the constant voltage means such that the indication means will be responsive to the linear indication on the output of the meter jitter minimizing means and will provide an indication of the rate parameter with respect to the predetermined reference node, i.e., the voltage level of the voltage across the indication means will be reduced by an amount equal to the constant voltage across the low voltage switching means. Meter movement smoothing is thereby assured due to the fact that the indication means is responsive to a linear indication rather than a pulsed indication.

Other objects and advantage of the present invention will become apparent from the ensuing description of illustrative embodiments thereof, in the course of which reference is had to the accompanying drawings in which:

FIG. 1 sets forth a preferred embodiment of the rate parameter indicator of the present invention.

GENERAL CIRCUIT DESCRIPTION

Figure 1:
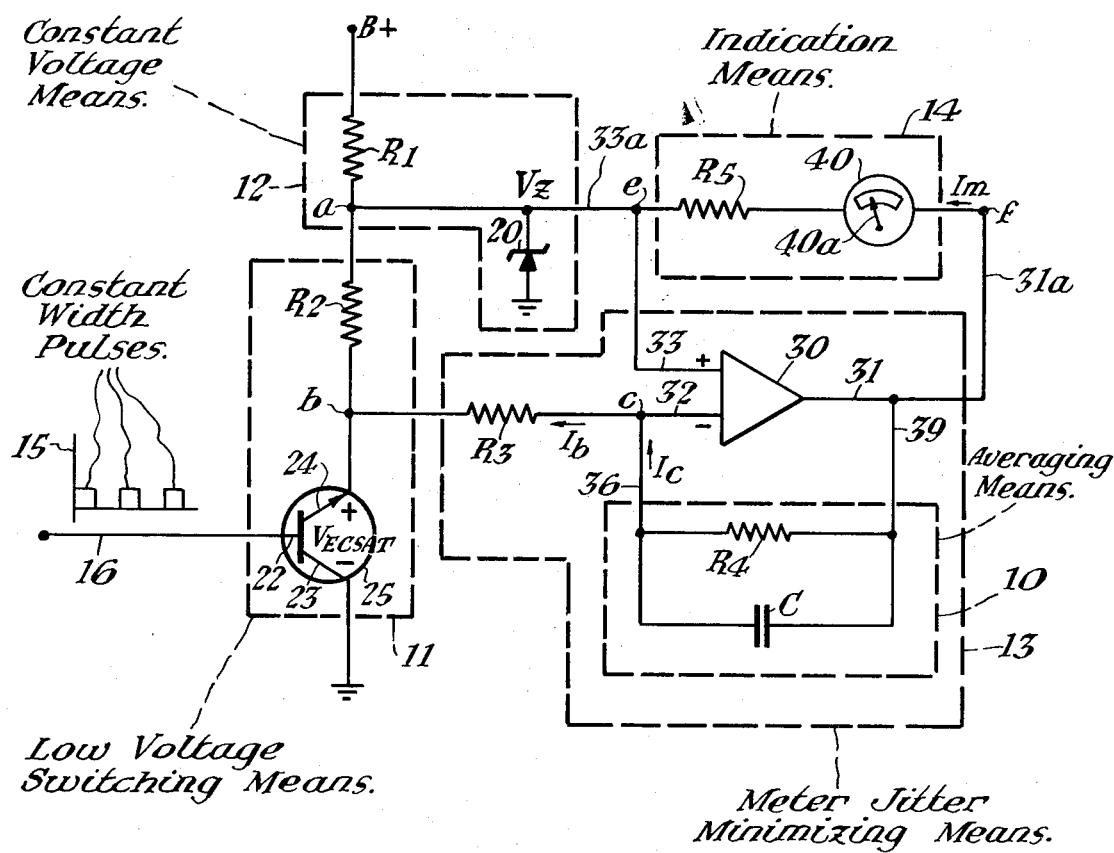
FIG. 1a depicts a waveform of the output of the meter jitter minimizing means without time averaging.
FIG. 1b illustrates a waveform of the output of the meter jitter minimizing means with time averaging.
FIG. 1c shows the waveform of FIG. 1b as referenced to a predetermined reference node, which is $V_z$ volts above ground, where $V_z$ equals the voltage across the low voltage drift switching means.

Referring now to FIG. 1 and viewing a preferred embodiment of the rate parameter indicator of the present invention, it will be seen that a low voltage switching means 11 having an input 16 is electrically coupled to a preselected reference node, which in this embodiment is ground, as well as a constant voltage means 12. The low voltage switching means includes a resistor R2 and N-P-N transistor 25 having a base electrode 22, a collector electrode 23, and an emitter electrode 24. Specifically, it is seen that the base electrode 22 of transistor 25 is electrically coupled to the input 16 of the low voltage switching means 11; the collector electrode 23 of transistor 25 is electrically coupled to ground; and the emitter electrode 24 of transistor 25 is electrically coupled to resistor R2. It should be noted that transistor 25 is interconnected in the circuit of FIG. 1 in a manner which is the reverse of normal transistor circuit interconnection, namely, collector electrode 23 is coupled to ground. Reasons for such connection are set forth fully in the inventor's copending application for Letters Patent of the United States, Ser. No. 879,732, filed Nov. 25, 1969, now U.S. Pat. No. 3,603,876, for Improved High Speed Rate Indicator, and may be simply stated that a relatively low and invariable emitter to collector voltage, $V_{ECSAT}$, is maintained across the transistor 25 when driven into saturation. Hence, any electrical connection to the emitter electrode 24 of transistor 25 is essentially and practically an electrical connection to ground when transistor 25 is in a conducting state.

The low voltage switching means 11 is electrically coupled via resistor R2 to a constant voltage means 12, which constant voltage means 12 includes a resistor R1 electrically coupled to a constant voltage source B+, and a diode means 20, which in the preferred embodiment of FIG. 1 is a Zener diode electrically coupled to ground. Shown in FIG. 1, is a meter jitter minimizing means 13 which includes an averaging means 10, a resistance R3, which is a meter jitter minimizing impedance means and amplifier means 30, which in the preferred embodiment of FIG. 1 is an operational amplifier. The resistance R3 is electrically coupled to the input side of amplifier 30 via lead 32, and the averaging means 10 is electrically coupled to the input and output sides of the amplifier 30 via leads 36 and 39, respectively. The averaging means 10 includes a resistor R4 and a capacitor C which, as shown, are in parallel connection. It is seen that meter jitter minimizing means 13 is electrically coupled to the low voltage switching means 11 via the connection of resistance R3 to node $b$ which is the common connection of emitter electrode 24 of transistor 25 and resistance R2. The meter jitter minimizing means 13 is also electrically coupled to the constant voltage means 12 via the connection of lead 33 from the input side of amplifier 30 to the lead 33a at node $e$.

As shown, an output 31 of the amplifier means 30 is electrically coupled to an indication means 14 via lead 31a. The indication means 14 includes an indication meter device 40 and a resistor R5 which is an indication impedance means. The indication means 14 is also electrically coupled to the meter jitter minimizing means 13 via the connection of resistor R5 over lead 33 to the input side of amplifier 30. Finally, the indication means 14 is also electrically coupled to the constant voltage means 12 via the connection of resistor R5 over the lead 33a to the Zener diode 20.

CIRCUIT OPERATION AND FUNCTION

Reference is now made to the operation of the rate parameter indicator of the present invention illustrated in FIG. 1. It is seen that a constant pulse-width waveform 15 is delivered to the base electrode 22 of transistor 25 over the lead 16. The frequency of this constant pulsewidth input is proportional to a rate parameter, the measurement of which is desirable. In the absence of the pulses on input 16 to transistor 25, the transistor 25 will, of course, be in a non-conducting state. Accordingly, there will be no voltage drop across resistor R2, i.e., nodes $a$ and $b$ will be at the same potential designated $V_Z$. In effect, the positive input terminal and the negative input terminal of operational amplifier 30 will be at the same potential, and disregarding capacitor C of the averaging means 10, for the present, amplifier 30 would produce no gain in the absence of a pulse on lead 16. This is so because, as is well known, the operational amplifier 30 will not produce a gain unless the positive terminal is driven more positive than the negative terminal, or in this case the negative terminal more negative than the positive terminal. Accordingly, in the absence of a pulse on input 16, and disregarding capacitor C of averaging circuit 10, the output 31 of amplifier 30 would be $V_Z$.

Figure 1A:
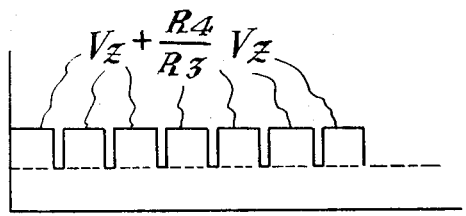

When a pulse does appear at the input 16 to the base electrode 22 of transistor 25, the transistor 25 will conduct, thereby producing a voltage drop across R2 approximately equal to the voltage drop, $V_Z$, across the Zener diode 20 of constant voltage means 12, remembering that the emitter to collector saturation voltage, $V_{ECSAT}$, of transistor 25 is, in all practicality, negligible. Hence, node $a$ is essentially at a potential $V_Z$, while node $b$ is essentially at ground potential. Hence resistor R3 has a voltage across it relatively negative with respect to voltage $V_Z$ at positive input lead 33 of amplifier 30. Furthermore, since it is a well-known fact that it is an inherent characteristic of operational amplifiers with feedback that zero voltage exists between positive and negative input terminals it is seen that the voltage across resistor R3 is substantially $-V_Z$. To insure that there is zero voltage between the positive and negative input terminals of amplifier 30, the output 31 of amplifier 30 is such that it causes the current flowing to node $c$, $I_c$ to be equal to the negative of the current flowing to node $b$, $I_b$. Since $I_b$ is itself a negative current, zero current flows toward the negative input terminal of amplifier 30. The above-noted output of amplifier 30, in the absence of capacitor C of averaging means 10, is accordingly equal to $V_Z(R4/R3)V_Z$ for each pulse on input 16 to transistor 25. Hence it is noted that in the absence of a pulse on input 16 to transistor 25 and without capacitor C of averaging means 10, operational amplifier 30 has an output 31 equal to $V_Z$; and in the presence of a pulse on input 16 to transistor 25 and without capacitor C of averaging means 10, operational amplifier 30 produces an output to $V_Z+(R4/R3)V_Z$. The waveform for the output 31 of operational amplifier 30 without capacitor C of averaging means 10 is shown in FIG. 1a. It will be noted that this waveform is a pulsed waveform which if input to indication meter 40 of indication means 14 would cause needle 40a to waver even though indication meter 40 may have a time averaging capacity.

Figure 1B:
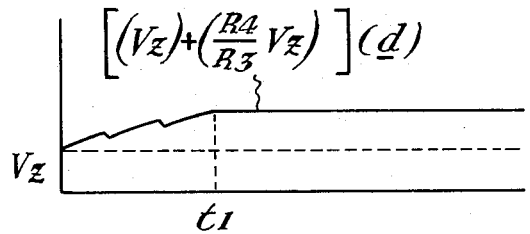
Figure 1C:
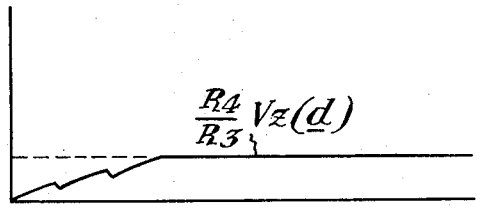

Now, with capacitor C of averaging circuit 10 being considered, the capacitor C would begin charging toward a voltage $(R4/R3)V_Z$ with the presence of each pulse on input 16 to transistor 25 and discharging through resistor R4 of averaging means 10 until after a permissible time period the voltage across capacitor C reaches a steady state value, thereby providing a steady state output 31 from operational amplifier 30 which is equal to $[V_Z+(R4/R3)V_Z](d)$, where $d$ is a frequency factor or duty cycle. The frequency factor $d$ is defined as the ratio of the time that one constant-width pulse is present at input 16 to transistor 25 to the time from the leading edge of that pulse to the leading edge of the next successive pulse. The waveform of output 31 of amplifier 30, with consideration of capacitor C of averaging means 10, is shown in FIG. 1b. The time $t_1$ in FIG. 1b is the point at which capacitor C is fully charged. It will be appreciated that for the time $t_1$, which will vary according to the rate to which an incoming pulse train is proportional, meter indication will be somewhat unsmooth. But it will further be appreciated that the results achieved by the waveform of FIG. 1b are a vast improvement over the results achieved by the waveform of FIG. 1a, thereby advancing the state of the art in a manner heretofore not known. It is noted that resistor R4 and capacitor C of averaging means 10 may be chosen such that the time $t_1$ is minimal with respect to the lowest duty cycle to be measured, a feature which could not be attributed to prior art systems.

As shown, indication meter 40 of indication means 14 receives the output 31 of operational amplifier means 30 via lead 31a. It will be seen that the indication meter 40 is also electrically connected to a potential voltage $V_Z$ at node $e$, through resistor R5 of indication means 14. Hence, the voltage between point $f$ and node $e$, i. e., the voltage across the indication means 14 is equal to $[V_Z+(R4/R3)V_Z](d) - V_Z(d)=(R4/R3)V_Z(d)$, which is the voltage across the indication means 14 with respect to zero voltage or ground, rather than voltage $V_Z$. Furthermore, the current $I_m$, flowing through indication meter 40 (assuming meter resistance negligible) is $$\frac{\frac{R4}{R3}V_z(d)}{R5} = \frac{R4}{R3R5}V_z(d)$$

Accordingly, resistors R3, R4, and R5 are chosen depending upon a desired maximum current flowing through the indication meter 40, bearing in mind that the value of resistor R4 must conform to the value required for a minimal time constant with respect to capacitor C of averaging means 10. It will be noted that a portion of R5 may be variable to allow adjustment if wear of the measured object is possible, for example, wheel wear of a railway vehicle. Hence, the indication meter 40 of indication means 14 will receive a substantially constant current proportional to the aforementioned rate parameter on lead 31a and meter jitter is, in practicality, nonexistant as was not the case in prior art systems for indicating and measuring of a rate parameter at low rates.

Thus, it is apparent that the new and improved rate parameter indicator of the present invention provides a more effective and electrically unique method for measuring and indicating the speed of an object by producing meter movement smoothing at low rates.

Having thus described my invention, what I claim is:

1. A rate parameter indicator having meter movement smoothing at low rates and including in combination, a. low voltage switching means electrically coupled to a preselected reference node and having a constant pulse-width input with a duty cycle proportional to said rate parameter, said duty cycle being the ratio of the time for one of said constant width pulses to the time from the leading edge of said one of said constant width pulses to the leading edge of the next successive one of said constant-width pulses, b. constant voltage means, and c. meter jitter minimizing means having an output, and d. indication means, said low voltage switching means electrically coupled to said constant voltage means so that whenever a pulse appears on said constant pulse-width input of said low voltage switching means, a constant voltage is maintained across said low voltage switching means, said meter jitter minimizing means electrically coupled to said low voltage switching means and said constant voltage means so that over a predetermined time period said meter jitter minimizing means generates an average of a recurring quantity with presence of each of said pulses appearing at said input of said low voltage switching means, said quantity being the sum of said constant voltage across said low voltage switching means plus the product of a predetermined impedance ratio times said constant voltage across said low voltage switching means, said average being the sum of said constant voltage across said low voltage switching means plus the product of said predetermined impedance ratio times said constant voltage across said low voltage switching means all times said duty cycle of said constant pulse-width input of said low voltage switching means, said meter jitter minimizing means having averaging means which provides said averaging of said recurring quantity over said predetermined time period to produce a linear indication proportional to said rate parameter on said output of said meter jitter minimizing means, said output of said meter jitter minimizing means electrically coupled to said indication means, and said indication means electrically coupled to said constant voltage means such that said indication means will be responsive to said linear indication on said output of said meter jitter minimizing means and will provide an indication of said rate parameter thereby assuring said meter movement smoothing due to the fact that said indication means is responsive to said linear indication rather than a pulsed indication.

2. The rate parameter indicator of claim 1 wherein said low voltage switching means includes a semiconductive device which receives said constant pulse-width input to said low voltage switching means and is electrically coupled to a load impedance, said load impedance electrically coupled to said voltage means, said semiconductive device having essentially relatively zero voltage across it whenever a pulse is present at said constant pulse-width input of said low voltage switching means.

3. The rate parameter indicator of claim 2 wherein said semiconductive device is a transistor having a base electrode, an emitter electrode, and a collector electrode, said base electrode receiving said constant pulse-width input to said low voltage switching means, said emitter electrode electrically coupled to said load impedance means, and said collector electrode electrically coupled to said preselected reference node.

4. The rate parameter indicator of claim 3 wherein said collector electrode of said transistor is electrically coupled to said constant voltage means through said preselected reference node.

5. The rate parameter indicator of claim 3 wherein said load impedance is a resistor.

6. The rate parameter indicator of claim 1 wherein said constant voltage means includes a constant voltage impedance means electrically coupled to a constant voltage source and a diode means, said constant voltage impedance means and said diode means respectively electrically coupled to said low voltage switching means and said meter jitter minimizing means, said diode means also electrically coupled to said low voltage switching means through said predetermined reference node.

7. The rate parameter indicator of claim 6 wherein said constant voltage impedance means is a resistor.

8. The rate parameter indicator of claim 6 wherein said diode means is a Zener diode.

9. The rate parameter indicator of claim 1 wherein said meter jitter minimizing means further includes meter jitter minimizing impedance means and amplifier means having an output, said meter jitter minimizing impedance means electrically coupled to said low voltage switching means and to said amplifier means, said amplifier means also electrically coupled to said constant voltage means, and said averaging means; said output of said amplifier means electrically coupled to said output of said meter jitter minimizing means, said averaging means also electrically coupled to said meter jitter minimizing impedance means.

10. The rate parameter indicator of claim 9 wherein said meter jitter minimizing impedance means is a resistor.

11. The rate parameter indicator of claim 9 wherein said amplifier means is a operational amplifier.

12. The rate parameter indicator of claim 9 wherein said averaging means comprises a resistance connected in parallel combination with a capacitance, said parallel combination electrically coupled to said output of said amplifier means, as well as said meter jitter minimizing impedance means.

13. The rate parameter indicator of claim 1 wherein said indication means includes an indication meter device and an indication impedance means, said indication meter device electrically coupled to said output of said meter jitter minimizing means and to said indication impedance means, said indication impedance means electrically coupled to said meter jitter minimizing means and to said constant voltage means.

14. The rate parameter indicator of claim 13 wherein said indication meter device is a D'arsonval meter.

15. The rate parameter indicator of claim 13 wherein said indication impedance means is a resistor.

* * * * *